United States Patent
Park et al.

(10) Patent No.: US 7,830,837 B2
(45) Date of Patent: Nov. 9, 2010

(54) METHOD OF DATA COMMUNICATION IN A WIRELESS COMMUNICATION SYSTEM

(75) Inventors: Sung Jun Park, Anyang-si (KR); Seung June Yi, Anyang-si (KR); Young Dae Lee, Anyang-si (KR); Sung Duck Chun, Anyang-si (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 12/591,608

(22) Filed: Nov. 24, 2009

(65) Prior Publication Data

US 2010/0074215 A1 Mar. 25, 2010

Related U.S. Application Data

(63) Continuation of application No. 12/382,673, filed on Mar. 20, 2009, now Pat. No. 7,756,081.

(60) Provisional application No. 61/038,470, filed on Mar. 21, 2008, provisional application No. 61/039,095, filed on Mar. 24, 2008, provisional application No. 61/074,998, filed on Jun. 23, 2008.

(30) Foreign Application Priority Data

Aug. 7, 2008 (KR) ............... 10-2008-0077569
Mar. 20, 2009 (KR) ............... 10-2009-0023896

(51) Int. Cl.
*H04W 4/00* (2009.01)

(52) U.S. Cl. .................... 370/329; 370/400

(58) Field of Classification Search ............ 370/329, 370/400; 714/748
See application file for complete search history.

(56) References Cited

U.S. PATENT DOCUMENTS 6,028,854 A 2/2000 Raith et al.
(Continued)

FOREIGN PATENT DOCUMENTS

JP 2006-087120 3/2006
(Continued)

OTHER PUBLICATIONS

Ericsson: "E-UTRAN Random Access procedure C-RNTI assignment and HARQ on message 4 with RACH model" 3GPP Draft; R2-070365, 3rd Generation Partnership Project (3GPP), vol. RAN WG2, XP050133443, Jan. 2007.
(Continued)

*Primary Examiner*—David Q Nguyen
(74) *Attorney, Agent, or Firm*—McKenna Long & Aldridge LLP

(57) ABSTRACT

A method of data communication in a wireless communication system is disclosed. A method of receiving data in a user equipment of a wireless communication system comprises receiving scheduling information from a network, the scheduling information including downlink (DL) resource assignment information and an indicator; if the scheduling information includes a first UE identity and the first indicator has a first value, utilizing the scheduling information as configuration information of a persistent scheduling to receive a downlink data packet from the network; and if the scheduling information includes the first UE identity and the first indicator has a second value, utilizing the scheduling information to receive a retransmission data packet from the network.

14 Claims, 11 Drawing Sheets

U.S. PATENT DOCUMENTS

| | | |
|---|---|---|
| 2003/0016698 A1 | 1/2003 | Chang et al. |
| 2005/0135318 A1 | 6/2005 | Walton et al. |
| 2005/0141436 A1 | 6/2005 | Dick et al. |
| 2005/0221833 A1 | 10/2005 | Granzow et al. |
| 2005/0221838 A1 | 10/2005 | Cha et al. |
| 2005/0287957 A1 | 12/2005 | Lee et al. |
| 2006/0023629 A1 | 2/2006 | Kim et al. |
| 2006/0251105 A1 | 11/2006 | Kim et al. |
| 2006/0281417 A1 | 12/2006 | Umesh et al. |
| 2007/0140178 A1 | 6/2007 | Jung et al. |
| 2007/0206531 A1 | 9/2007 | Pajukoski et al. |
| 2007/0242764 A1 | 10/2007 | Anigstein et al. |
| 2007/0248060 A1 | 10/2007 | Mooney et al. |
| 2007/0288824 A1 | 12/2007 | Yeo et al. |
| 2007/0291719 A1 | 12/2007 | Demirhan et al. |
| 2008/0005638 A1* | 1/2008 | Kuo et al. ............... 714/748 |
| 2008/0192674 A1 | 8/2008 | Wang et al. |
| 2009/0041240 A1 | 2/2009 | Parkvall et al. |
| 2009/0103500 A1* | 4/2009 | Malkamaki et al. ......... 370/336 |
| 2009/0168731 A1 | 7/2009 | Zhang et al. |
| 2009/0245194 A1 | 10/2009 | Damnjanovic et al. |
| 2009/0287976 A1 | 11/2009 | Wang et al. |
| 2010/0067460 A1 | 3/2010 | Hu et al. |

FOREIGN PATENT DOCUMENTS

| | | |
|---|---|---|
| KR | 10-2001-0110188 | 12/2001 |
| KR | 10-0389818 | 12/2001 |
| KR | 10-2003-0043426 | 6/2003 |
| KR | 10-2005-0120189 | 12/2005 |
| KR | 10-2006-0067329 | 6/2006 |
| KR | 10-2006-0131808 | 12/2006 |
| KR | 10-2007-0026156 | 3/2007 |
| KR | 10-2007-0080544 | 8/2007 |
| KR | 10-2007-0121505 | 12/2007 |
| KR | 10-2008-0003682 | 1/2008 |
| KR | 10-2008-0018105 | 2/2008 |
| WO | WO 2005/125226 | 12/2005 |
| WO | WO 2007/091520 | 8/2007 |
| WO | WO 2007/148706 | 12/2007 |
| WO | WO 2009/020423 | 2/2009 |
| WO | WO 2009/045011 | 4/2009 |

OTHER PUBLICATIONS

Ericsson: 3GPP Draft; R1-080898, 3rd Generation Partnership Project (3GPP), vol. RAN WG1, XP050109373, Feb. 2008.

LG Electronics Inc: "Allocation of A short A CRNTI in msg2" 3GPP Draft; R2-081038 Short CRNTI, 3rd Generation Partnership Project (3GPP), vol. RAN WG2, XP050138828, Feb. 2008.

Nokia Siemens Networks et al: Way Forward on Scrambling Sequence Initialization 3GPP Draft: R1-081128, 3rd Generation Partnership Project (3GPP), vol. RAN WG1, XP050109572, Feb. 2008.

LG Electronics Inc., "Scrambling of Message 3", 3rd Generation Partnership Project(3GPP), 3GPP Draft; R2-082508, vol. RAN WG2, XP050140189, Apr. 2008.

Persson, F., "Voice over IP Realized for the 3GPP Long Term Evolution", Vehicular Technology Conference, IEEE $66^{th}$, 2007, pp. 1436-1440.

3GPP TS 36.300 V8.4.0: $3^{rd}$ Generation Partnership Project; Technical Specification Group Radio Access Network: Evolved Universal Terrestrial Radio Access (E-UTRA) and Evolved Universal Terrestrial Radio Access Network (E-UTRAN); Overall description; Stage 2 (Release 8); Mar. 17, 2008.

Nokia Corporation et al., "On Resource Release in Enhanced UL for CELL_FACH", 3GPP Draft; R2-080272, Jan. 7, 2008.

NEC, "Comparison of HS-based E-RACH resource assignment", 3GPP Draft; R2-080128, Comparison of HS-Based E-Rach Resource Assignment, $3^{rd}$ Generation Partnership Project (3GPP), Jan. 9, 2008.

LG Electronics, "Load Management of E-DCH Resource Release", 3GPP TSG-RAN WG2 #61BIS, R2-081829, Mar. 31, 2008, p. 1-4.

Ericsson, "Back-off operation for enhanced uplink in CELL_FACH", 3GPP Draft, R2-081502_EUL_BACK_OFF, $3^{rd}$ Generation Partnership Project (3GPP), Mar. 25, 2008.

"3GPP TS 36.321, V8.0.0, Medium Access Control Protocol Specification", XP002521635, pp. 1-23, Dec. 1, 2007.

LG Electronics: "HARQ Feedback and Measurement Gap", 3GPP Draft; R2-081602, $3^{rd}$ Generation Partnership Project (3GPP), XP050139330, Mar. 25, 2008.

NTT Docomo et al.: "UL HARQ handling when P-HICH collides with measurement gap", 3GPP Draft, R2-081727, $3^{rd}$ Generation Partnership Project (3GPP), XP050139439, Mar. 25, 2008.

* cited by examiner

METHOD OF DATA COMMUNICATION IN A WIRELESS COMMUNICATION SYSTEM

This application is a continuation of U.S. application Ser. No. 12/382,673, filed Mar. 20, 2009 now U.S. Pat. No. 7,756,081 and claims the benefit of the Korean Patent Application No. 10-2008-0077569, filed on Aug. 7, 2008, Korean Patent Application No. 10-2009-0023896 filed on Mar. 20, 2009, U.S. Provisional Application No. 61/038,470, filed on Mar. 21, 2008, U.S. Provisional Application No. 61/039,095, filed on Mar. 24, 2008, and U.S. Provisional Application No. 61/074,998, filed on Jun. 23, 2008, the contents of each of which are hereby incorporated by reference herein in their entireties.

TECHNICAL FIELD

The present invention relates to a wireless communication system, and more particularly, to a method of data communication in a wireless communication system.

BACKGROUND ART

In a wireless communication system which uses multiple carriers, such as an orthogonal frequency division multiple access (OFDMA) or a single carrier-frequency division multiple access (SC-FDMA), radio resources are a set of continuous sub-carriers and are defined by a time-frequency region on a two-dimensional sphere. A time-frequency region is a rectangular form sectioned by time and sub-carrier coordinates. In other words, one time-frequency region could be a rectangular form sectioned by at least one symbol on a time axis and a plurality of sub-carriers on a frequency axis. Such a time-frequency region can be allocated to an uplink for a specific user equipment (UE), or a base station can transmit the time-frequency region to a specific user equipment in a downlink. In order to define such a time-frequency region on the two-dimensional sphere, the number of OFDM symbols and the number of continuous sub-carriers starting from a point having an offset from a reference point should be given.

An evolved universal mobile telecommunications system (E-UMTS) which is currently being discussed uses 10 ms radio frame comprising 10 sub-frames. Namely, one sub-frame includes two continuous slots. One slot has a length of 0.5 ms. Also, one sub-frame comprises a plurality of OFDM symbols, and a part (for example, first symbol) of the plurality of OFDM symbols can be used for transmission of L1/L2 control information.

FIG. 1 illustrates an example of a structure of physical channels used in the E-UMTS. In FIG. 1, one sub-frame comprises an L1/L2 control information transmission region (hatching part) and a data transmission region (non-hatching part).

FIG. 2 illustrates a general method of transmitting data in the E-UMTS. In the E-UMTS, a hybrid auto repeat request (HARQ) scheme, which is one of data retransmission schemes, is used to improve throughput, thereby enabling desirable communication.

Referring to FIG. 2, the base station transmits downlink scheduling information (hereinafter, referred to as 'DL scheduling information') through DL L1/L2 control channel, for example, a physical downlink control channel (PDCCH), to transmit data to a user equipment in accordance with the HARQ scheme. The DL scheduling information includes user equipment identifier (UE ID) or group identifier (group ID) of user equipments, location and duration (resource assignment and duration of assignment) information of radio resources allocated for transmission of downlink data, modulation mode, payload size, transmission parameters such as MIMO related information, HARQ process information, redundancy version, and new data indicator.

In order to notify that DL scheduling information is transmitted through the PDCCH for what user equipment, the user equipment identifier (or group identifier), for example, a radio network temporary identifier (RNTI) is transmitted. The RNTI can be classified into a dedicated RNTI and a common RNTI. The dedicated RNTI is used for data transmission and reception to and from a user equipment of which information is registered with a base station. The common RNTI is used if communication is performed with user equipments, which are not allocated with dedicated RNTI as their information is not registered with the base station. Alternatively, the common RNTI is used for transmission and reception of information used commonly for a plurality of user equipments, such as system information. For example, examples of the common RNTI include RA-RNTI and T-C-RNTI, which are used during a random access procedure through a random access channel (RACH). The user equipment identifier or group identifier can be transmitted in a type of CRC (Cyclic Redundancy Check) masking in DL scheduling information transmitted through the PDCCH.

User equipments located in a specific cell monitor the PDCCH through the L1/L2 control channel using their RNTI information, and receive DL scheduling information through the corresponding PDCCH if they successfully perform CRC decoding through their RNTI. The user equipments receive downlink data transmitted thereto through a physical downlink shared channel (PDSCH) indicated by the received DL scheduling information.

A scheduling mode can be classified into a dynamic scheduling mode and a persistent or semi-persistent scheduling mode. The dynamic scheduling mode is to transmit scheduling information to a specific user equipment through the PDCCH whenever allocation of uplink or downlink resources is required for the specific user equipment. The persistent scheduling mode means that the base station allocates downlink or uplink scheduling information to the user equipment statically during initial call establishment such as establishment of a radio bearer. In this document, the term of "persistent scheduling" has the same meaning with "semi-persistent scheduling."

In case of the persistent scheduling, the user equipment transmits or receives data using scheduling information previously allocated to the base station without using DL scheduling information or UL scheduling allocated from the base station. For example, if the base station previously sets a specific user equipment to allow the user equipment to receive downlink data through RRC signal and a radio resource "A" in accordance with a transport format "B" and a period "C" during establishment of a radio bearer, the user equipment can receive downlink data transmitted from the base station using information "A", "B" and "C". Likewise, even in case that the user equipment transmits data to the base station, the user equipment can transmit uplink data using a previously defined radio resource in accordance with previously allocated uplink scheduling information. The persistent scheduling is a scheduling mode that can well be applied to a service of which traffic is regular, such as voice communication.

AMR codec used in voice communication, i.e., voice data generated through voice codec has a special feature. Namely, voice data are classified into a talk spurt and a silent period. The talk spurt means a voice data period generated while a person is actually talking, and the silent period means a voice data period generated while a person does not talk. For example, voice packets, which include voice data in the talk spurt, are generated per 20 ms, and silent packets (SID), which include voice data in the silent period, are generated per 160 ms.

If the persistent scheduling is used for voice communication, the base station will establish radio resources in accordance with the talk spurt. Namely, the base station will previously establish radio resources for transmitting and receiving uplink or downlink data to and from the user equipment at an interval of 20 ms during call establishment using a feature that voice packets are generated per 20 ms. The user equipment receives downlink data or transmits uplink data using radio resources, which are previously established per 20 ms.

DISCLOSURE OF THE INVENTION

As described above, when uplink or downlink resources for voice communication are scheduled using the persistent scheduling, it is required that the silent period should be converted to the talk spurt. On the other hand, if the talk spurt is converted to the silent period, it is required that the base station should quickly change radio resource allocation information, which is previously allocated, to reallocate radio resources suitable for a feature of the converted period. In addition to mutual conversion between the silent period and the talk spurt, if an event, such as conversion between AMR codec modes during voice communication and conversion between a period where full header packets are generated in a PDCP entity and a period where compressed header packets are generated therein, occurs, a problem occurs in that data generated after the event occurs cannot be transmitted or received efficiently using radio resources previously allocated in accordance with the persistent scheduling.

In the wireless communication system, communication can be performed in such a manner that the dynamic scheduling and the persistent scheduling are simultaneously applied to one user equipment. For example, if voice communication according to VoIP service is performed in accordance with the HARQ scheme, the persistent scheduling is applied to initial transmission packets, and the dynamic scheduling is applied to retransmission packets. Also, if the user equipment simultaneously uses two or more services, the persistent scheduling can be applied to one service and the dynamic scheduling can be applied to the other service. In these cases, it is required that the user equipment should definitely identify whether scheduling information transmitted thereto depends on what scheduling mode, or whether the scheduling information is for configuration of a persistent scheduling or for transmitting/receiving retransmission packets, or whether the scheduling information is for what service.

Accordingly, the present invention is directed to a method of data communication in a wireless communication system, which substantially obviates one or more problems due to limitations and disadvantages of the related art.

An object of the present invention is to provide a method of data communication in a wireless communication system, in which radio resources can efficiently be used in the wireless communication system.

Another object of the present invention is to provide a method of data communication in a wireless communication system, in which a user equipment can clearly differentiate scheduling information for configuration of a persistent scheduling from scheduling information for transmitting/receiving retransmission data packets.

Further another object of the present invention is to provide a method of data communication in a wireless communication system, in which a user equipment can identify HARQ process identifiers for initial transmission data packets during downlink HARQ transmission which is performed in an asynchronous mode when a persistent scheduling is used.

To achieve these objects and other advantages and in accordance with the purpose of the invention, as embodied and broadly described herein, in one aspect of the present invention, a method of receiving data in a user equipment of a wireless communication system comprises receiving a first data packet from a network in accordance with a first scheduling mode, receiving a second data packet using scheduling information received from the network, and recovering, when a pre-defined value is included in a process ID field included in the scheduling information, a third data packet using the first data packet and the second data packet.

In another aspect of the present invention, a method of data communication in a user equipment of a wireless communication system comprises receiving indication information from a network, the indication information indicating that radio resources are allocated in accordance with a specific scheduling mode among at least two scheduling modes, and transmitting uplink data or receiving downlink data using the radio resources allocated in accordance with a scheduling mode indicated by the indication information.

In further another aspect of the present invention, a method of data communication in a user equipment of a wireless communication system comprises transmitting uplink data or receiving downlink data through radio resources allocated in accordance with a persistent scheduling mode, and transmitting indication information to a network through an uplink channel if a predetermined event occurs, the indication information indicating that the event has occurred.

In further another aspect of the present invention, a method of data communication at a user equipment (UE) in a wireless communication system comprises receiving scheduling information from a network, the scheduling information including downlink (DL) resource assignment information and an indicator; if the scheduling information includes a first UE identity and the first indicator has a first value, utilizing the scheduling information as configuration information of a persistent scheduling to receive a downlink data packet from the network; and if the scheduling information includes the first UE identity and the first indicator has a second value, utilizing the scheduling information to receive a retransmission data packet from the network.

In further another aspect of the present invention, a method of data communication at a user equipment (UE) in a wireless communication system comprises receiving scheduling information from a network, the scheduling information including uplink (UL) resource assignment information and an indicator; if the scheduling information includes a first UE identity and the first indicator has a first value, utilizing the scheduling information as configuration information of a persistent scheduling to transmit an uplink data packet to the network; and if the scheduling information includes the first UE identity and the first indicator has a second value, utilizing the scheduling information to transmit a retransmission data packet to the network.

In further another aspect of the present invention, a method of data communication at a user equipment (UE) in a wireless communication system comprises receiving scheduling information for configuration of a persistent scheduling from a network, and receiving at least two downlink data packets from the network based on the received scheduling information, wherein each of HARQ process identifiers for the at least two downlink data packets is set to each at least two HARQ process identifiers one after another, the at least two HARQ process identifiers previously allocated to the UE by the network.

In further another aspect of the present invention, a method of data communication at a network in a wireless communication system comprises allocating at least two HARQ process identifiers to a user equipment (UE) to receive downlink data in accordance with a persistent scheduling, transmitting scheduling information for configuration of the persistent scheduling to the UE, and transmitting at least two downlink data packets to the UE based on the scheduling information, wherein each of HARQ process identifiers for the at least two downlink data packets is set to each of the allocated at least two HARQ process identifiers one after another.

In this specification, "scheduling information" means information transmitted from a network to a user equipment to allocate downlink and/or uplink resource to the user equipment. The scheduling information can be transmitted on a control channel and include downlink and/or uplink resource assignment information and HARQ-related information. The term of "scheduling information" can be replaced with another term which has been normally used in the art to which the present invention pertains, such as "resource assignment (or allocation) information," "downlink or uplink assignment information," and "downlink/uplink assignment," etc.

BRIEF DESCRIPTION OF THE DRAWINGS

FIG. 5A and FIG. 5B are diagrams illustrating a structure of a radio interface protocol between a user equipment (UE) and E-UTRAN, in which FIG. 5A is a schematic view of a control plane protocol and FIG. 5B is a schematic view of a user plane protocol;

BEST MODE FOR CARRYING OUT THE INVENTION

Hereinafter, structures, operations, and other features of the present invention will be understood readily by the preferred embodiments of the present invention, examples of which are illustrated in the accompanying drawings. Embodiments described later are examples in which technical features of the present invention are applied to an E-UMTS (Evolved Universal Mobile Telecommunications System).

Figure 1:
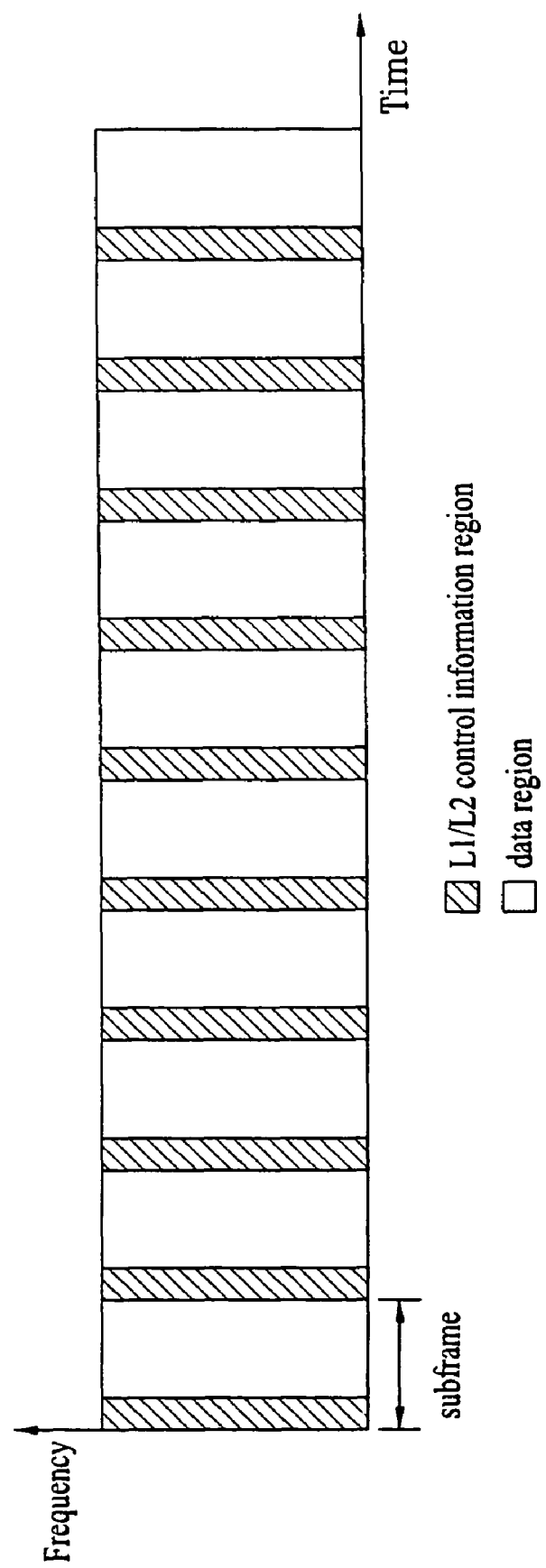
FIG. 1 is a diagram illustrating an example of a structure of a physical channel used in an E-UMTS (Evolved-Universal Mobile Telecommunications System)
Figure 2:
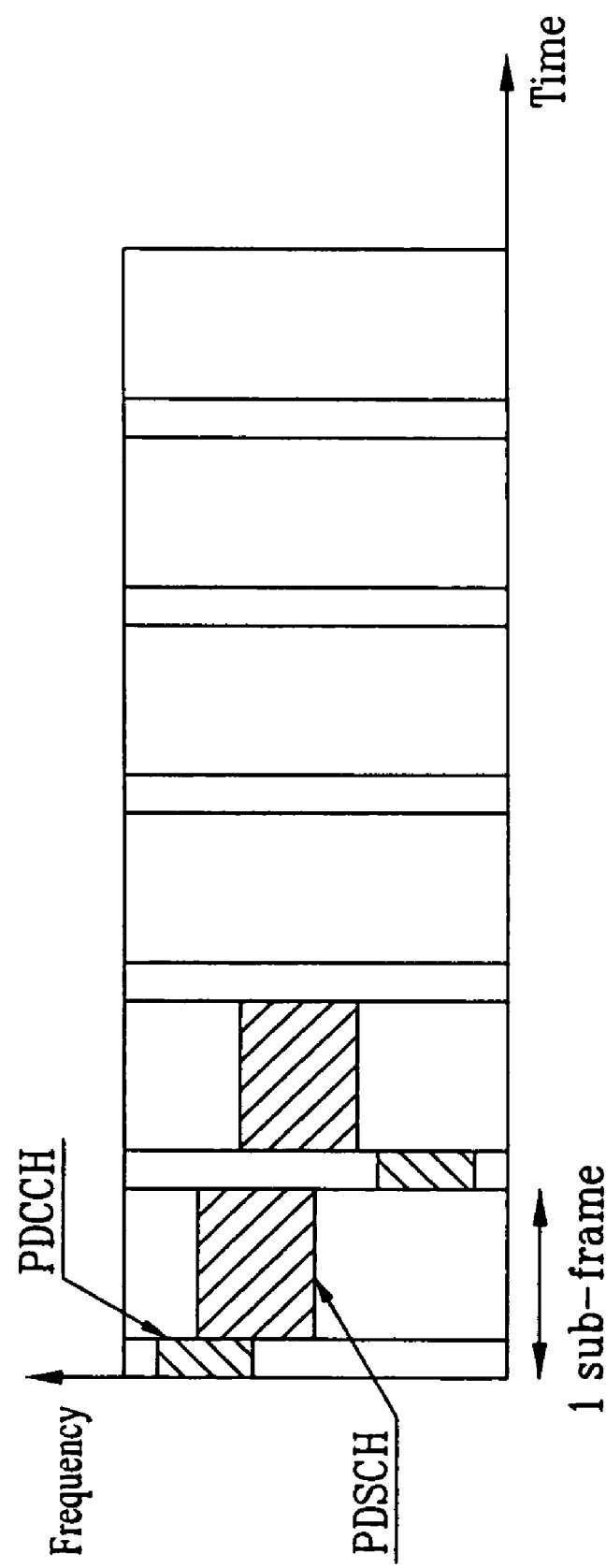
FIG. 2 is a diagram illustrating a general method of transmitting data in an E-UMTS.
Figure 3:
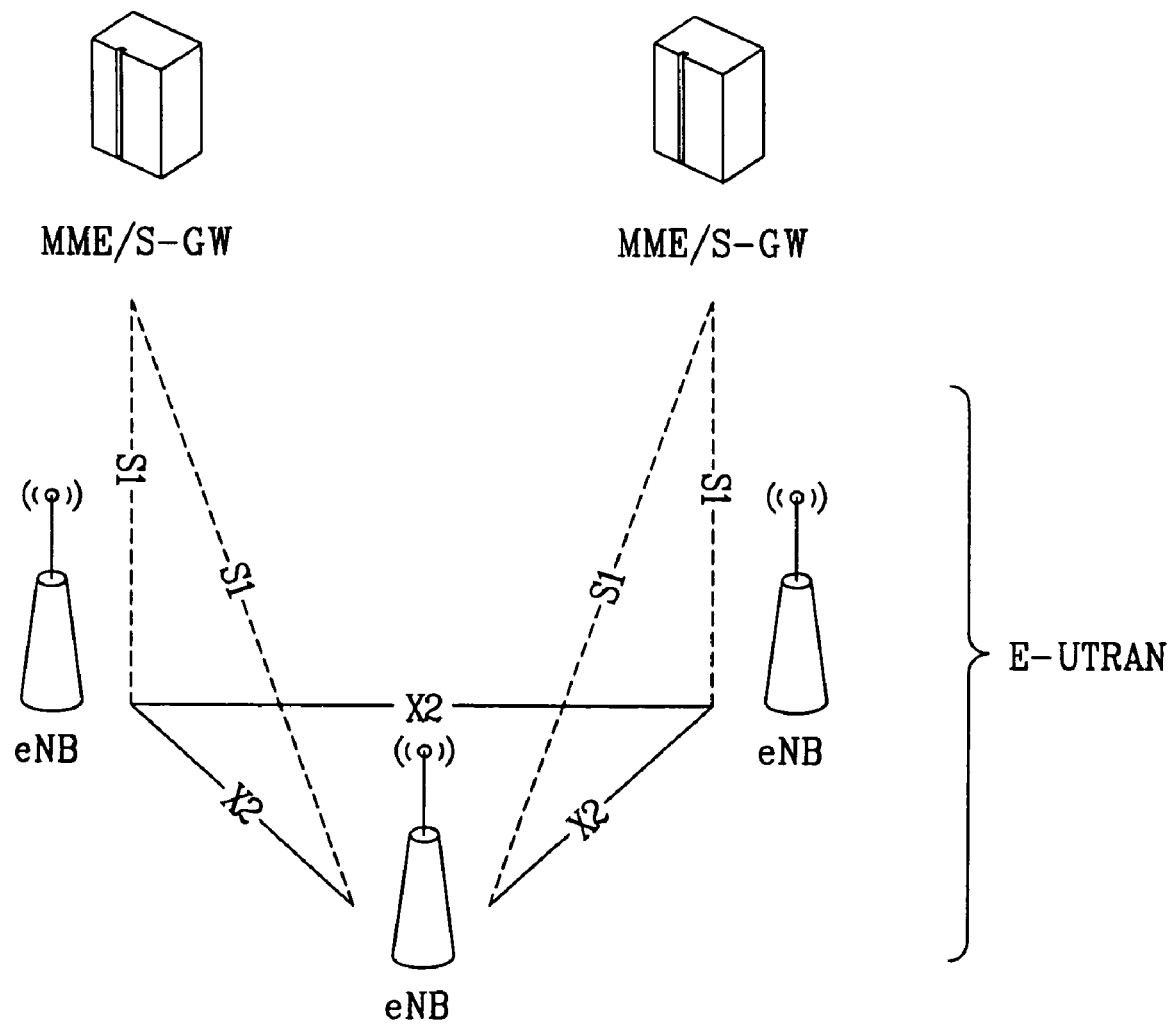
FIG. 3 is a diagram illustrating a network structure of an E-UMTS.

FIG. 3 illustrates a network structure of an E-UMTS. An E-UMTS is a system evolving from the conventional WCDMA UMTS and its basic standardization is currently handled by the 3GPP ($3^{rd}$ Generation Partnership Project). The E-UMTS can also be called an LTE (Long Term Evolution) system.

Referring to FIG. 3, an E-UTRAN includes base stations (hereinafter, referred to as 'eNode B' or 'eNB'), wherein respective eNBs are connected with each other through X2 interface. Also, each of eNBs is connected with a user equipment (UE) through a radio interface and connected with EPC (Evolved Packet Core) through S1 interface. The EPC includes a mobility management entity/system architecture evolution (MME/SAE) gateway.

Layers of a radio interface protocol between a user equipment and a network can be classified into a first layer L1, a second layer L2 and a third layer L3 based on three lower layers of OSI (open system interconnection) standard model widely known in communication systems. A physical layer belonging to the first layer L1 provides an information transfer service using a physical channel. A radio resource control (hereinafter, abbreviated as 'RRC') located at the third layer plays a role in controlling radio resources between the user equipment and the network. For this, the RRC layer enables RRC messages to be exchanged between the UE and the network. The RRC layer can be distributively located at network nodes including Node B, an AG and the like or can be independently located at either the Node B or the AG.

Figure 4:
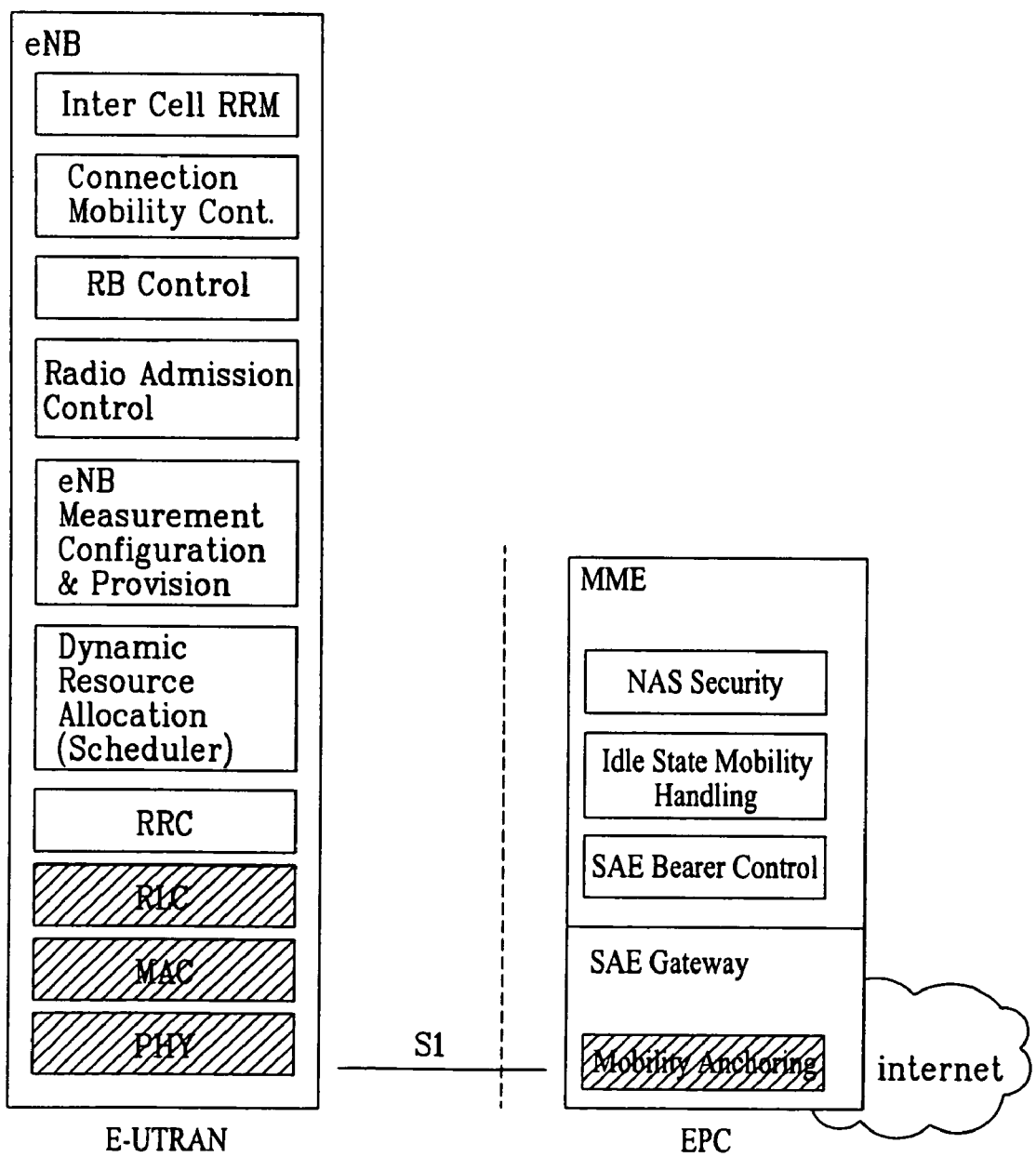
FIG. 4 is a schematic view illustrating an E-UTRAN (Evolved Universal Terrestrial Radio Access Network)

FIG. 4 is a schematic view illustrating an E-UTRAN (UMTS terrestrial radio access network). In FIG. 4, a hatching part represents functional entities of a user plane, and a non-hatching part represents functional entities of a control plane.

Figure 5A:
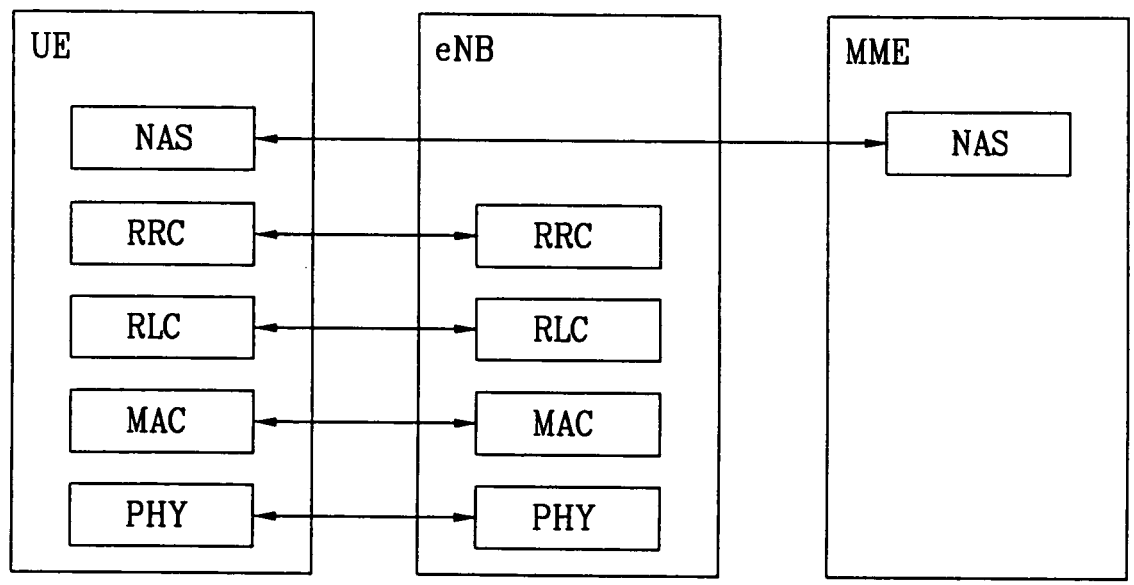
Figure 5B:
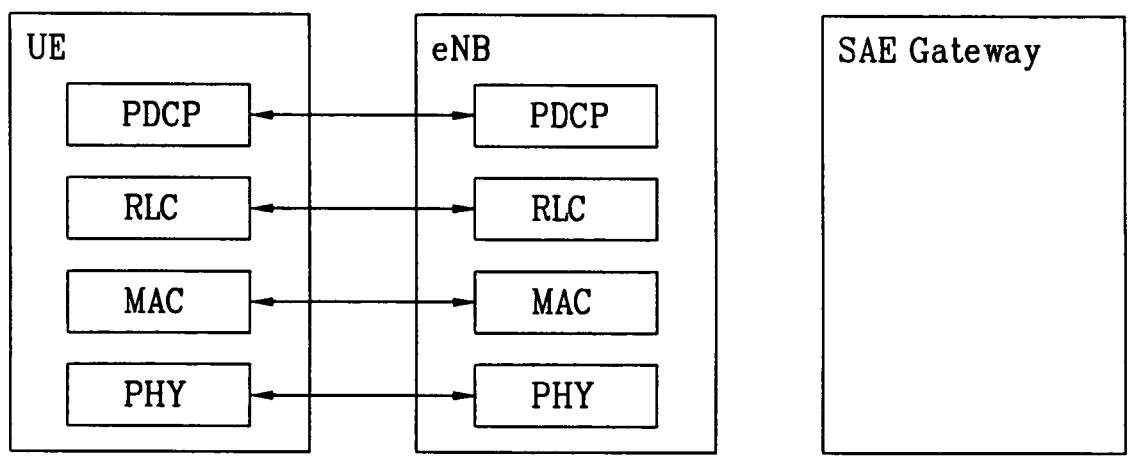

FIG. 5A and FIG. 5B illustrate a structure of a radio interface protocol between the user equipment (UE) and the E-UTRAN, in which FIG. 5A is a schematic view of a control plane protocol and FIG. 3B is a schematic view of a user plane protocol. Referring to FIG. 5A and FIG. 5B, a radio interface protocol horizontally includes a physical layer, a data link layer, and a network layer, and vertically includes a user plane for data information transfer and a control plane for signaling transfer. The protocol layers in FIG. 5A and FIG. 5B can be classified into L1 (first layer), L2 (second layer), and L3 (third layer) based on three lower layers of the open system interconnection (OSI) standard model widely known in the communications systems.

The physical layer as the first layer provides an information transfer service to an upper layer using physical channels. The physical layer (PHY) is connected to a medium access control (hereinafter, abbreviated as 'MAC') layer above the physical layer via transport channels. Data are transferred between the medium access control layer and the physical layer via the transport channels. Moreover, data are transferred between different physical layers, and more particularly, between one physical layer of a transmitting side and the other physical layer of a receiving side via the physical channels. The physical channel of the E-UMTS is modulated in accordance with an orthogonal frequency division multiplexing (OFDM) scheme, and time and frequency are used as radio resources.

The medium access control (hereinafter, abbreviated as 'MAC') layer of the second layer provides a service to a radio link control (hereinafter, abbreviated as 'RLC') layer above the MAC layer via logical channels. The RLC layer of the second layer supports reliable data transfer. In order to effectively transmit data using IP packets (e.g., IPv4 or IPv6) within a radio-communication period having a narrow bandwidth, a PDCP layer of the second layer (L2) performs header compression to reduce the size of unnecessary control information.

A radio resource control (hereinafter, abbreviated as 'RRC') layer located on a lowest part of the third layer is defined in the control plane only and is associated with configuration, reconfiguration and release of radio bearers (hereinafter, abbreviated as 'RBs') to be in charge of controlling the logical, transport and physical channels. In this case, the RB means a service provided by the second layer for the data transfer between the user equipment and the UTRAN.

As downlink transport channels carrying data from the network to the user equipments, there are provided a broadcast channel (BCH) carrying system information, a paging channel (PCH) carrying paging message, and a downlink shared channel (SCH) carrying user traffic or control messages. The traffic or control messages of a downlink multicast or broadcast service can be transmitted via the downlink SCH or an additional downlink multicast channel (MCH). Meanwhile, as uplink transport channels carrying data from the user equipments to the network, there are provided a random access channel (RACH) carrying an initial control message and an uplink shared channel (UL-SCH) carrying user traffic or control message.

As logical channels located above the transport channels and mapped with the transport channels, there are provided a broadcast control channel (BCCH), a paging control channel (PCCH), a common control channel (CCCH), a multicast control channel (MCCH), and a multicast traffic channel (MTCH).

In the E-UMTS system, an OFDM is used on the downlink and a single carrier frequency division multiple access (SC-FDMA) on the uplink. The OFDM scheme using multiple carriers allocates resources by unit of multiple sub-carriers including a group of carriers and utilizes an orthogonal frequency division multiple access (OFDMA) as an access scheme.

Figure 6:
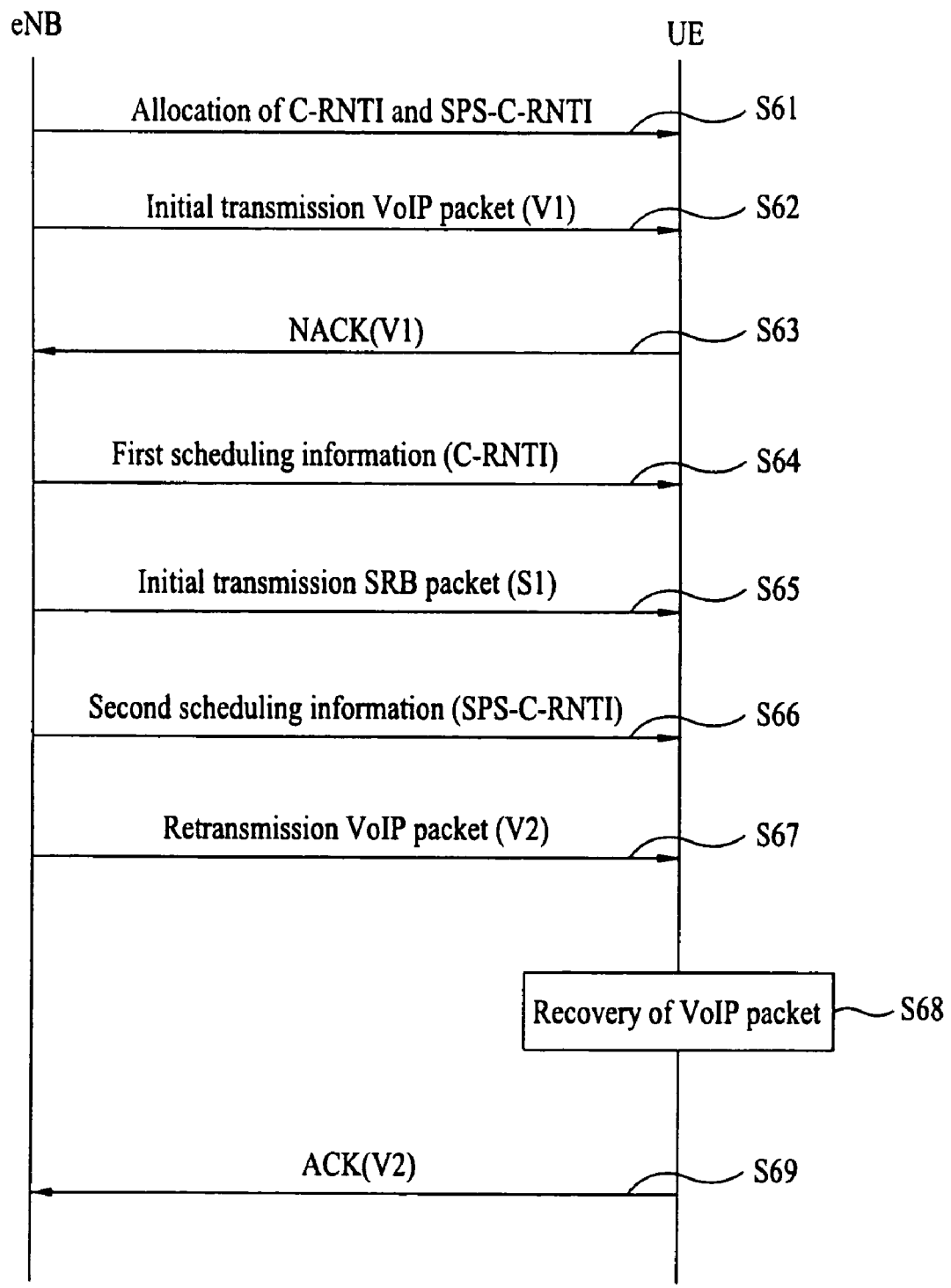
FIG. 6 is a flow chart illustrating a procedure of a method of data communication in accordance with one embodiment of the present invention.

FIG. 6 is a flow chart illustrating a procedure of a method of transmitting data in accordance with one embodiment of the present invention. According to the embodiment of FIG. 6, the user equipment (UE) receives an SRB packet in accordance with a dynamic scheduling while receiving voice data (VoIP packet) in accordance with a persistent scheduling. Hereinafter, description will be made only if necessary for understanding of the embodiment of the present invention, and description of a general procedure required for communication between a network and a user equipment will be omitted.

Referring to FIG. 6, the eNode B (eNB) allocates two user equipment identifiers to the user equipment [S61]. Examples of the two user equipment identifiers include C-RNTI and SPS-C-RNTI (Semi-Persistent Scheduling). However, the two user equipment identifiers will not be limited to the above examples. For example, temporary C-RNTI and RA-RNTI may be used as the two user equipment identifiers. The two user equipment identifiers can be allocated to the user equipment by the network during a random access procedure, call establishment procedure, or radio bearer (RB) establishment procedure. Also, the two user equipment identifiers may be allocated simultaneously or individually.

The eNode B transmits an initial transmission VoIP packet V1 to the user equipment through the PDSCH [S62]. The initial transmission VoIP packet V1 means a voice packet which is not a retransmission packet in case that the HARQ scheme is used. If the user equipment fails to successfully receive the initial transmission VoIP packet V1, i.e., if the user equipment fails to decode the initial transmission VoIP packet V1, the user equipment transmits NACK signal to the eNode B through a physical uplink control channel (PUCCH) [S63]. The persistent scheduling is used for transmission and reception of the initial transmission VoIP packet V1 and NACK signal. In other words, the user equipment uses scheduling information previously allocated to the eNode B without receiving DL scheduling information or UL scheduling information from the eNode B whenever receiving the initial transmission VoIP packet V1 or transmitting the NACK signal (or ACK signal). Accordingly, the user equipment does not need to receive scheduling information in the steps S62 and S63.

As described above, when the user equipment receives the initial transmission VoIP packet V1 or transmits the NACK signal (or ACK signal), the persistent scheduling is used. However, the dynamic scheduling is used for transmission of a retransmission VoIP packet through the eNode B. Accordingly, after transmitting the NACK signal, the user equipment should first receive scheduling information to receive the retransmission packet. To this end, the user equipment monitors the PDCCH of the L1/L2 control channel.

In FIG. 6, the eNode B transmits first scheduling information to the user equipment through the PDCCH [S64]. The first scheduling information is to allocate uplink and/or downlink channel resources to the user equipment in accordance with the dynamic scheduling. The first scheduling information can include DL scheduling information and UL scheduling information. It is supposed that the first scheduling information is scheduling information for transmitting SRB packets to the user equipment.

Since the user equipment transmits NACK for to the initial transmission VoIP packet transmitted from the eNode B in step S63, the user equipment monitors the PDCCH to receive a retransmission VoIP packet related with the initial transmission VoIP packet V1. However, if scheduling information for receiving the retransmission VoIP packet is not transmitted through the PDCCH but the first scheduling information for transmitting SRB packet is transmitted like step S64, according to the related art, the user equipment may misunderstand the first scheduling information as the scheduling information for receiving the retransmission VoIP packet. In this case, the user equipment determines the received initial transmission SRB packet as the retransmission VoIP packet using the first scheduling information and combines the packet with the initial transmission VoIP packet in accordance with the HARQ scheme to try packet recovery, whereby an error occurs.

In order to prevent the error, according to the embodiment of FIG. 6, the scheduling information transmitted through the PDCCH includes indication information indicating that the corresponding scheduling information is transmitted in accordance with a specific scheduling mode. In the embodiment of FIG. 6, the two user equipment identifiers allocated in step S61 are used as the indication information. In other words, the C-RNTI can be used as information indicating that the scheduling information is transmitted in accordance with the dynamic scheduling while the SPS-C-RNTI can be used as information indicating that the scheduling information for transmitting the retransmission packet related with the initial transmission packet is transmitted in accordance with the persistent scheduling. Namely, in FIG. 6, the SPS-RNTI is used to indicate that the corresponding scheduling information is scheduling information for transmitting the retransmission VoIP packet for the initial transmission VoIP packet transmitted in accordance with the persistent scheduling. The C-RNTI or the SPS-C-RNTI can be transmitted by either being included in the scheduling information or being CRC-masked with at least part of the scheduling information.

In FIG. 6, if the C-RNTI is included in the scheduling information received in the step S64, the user equipment recognizes that the scheduling information is scheduling information according to the dynamic scheduling, and receives an initial transmission SRB packet S1 transmitted from the eNode B using the scheduling information [S65].

The eNode B transmits second scheduling information to the user equipment through the PDCCH to transmit a retransmission packet V2 associated with the initial transmission VoIP packet V1, wherein the second scheduling information includes the SPS-C-RNTI [S66]. If the user equipment receives the second scheduling information which includes the SPS-C-RNTI, the user equipment receives the retransmission VoIP packet V2, which is transmitted from the eNode B, using the second scheduling information [S67]. The user equipment combines the received retransmission VoIP packet V2 with the initial transmission VoIP packet V1 in accordance with the HARQ scheme to recover the VoIP packet [S68]. If the user equipment successfully recovers the VoIP packet, the user equipment transmits ACK signal to the eNode B [S69]. The VoIP packet means a data packet intended to be transmitted from the eNode B to the user equipment. The VoIP packet is divided into the initial transmission the VoIP packet V1 and the retransmission VoIP packet V2 and then transmitted to the user equipment in accordance with the HARQ scheme.

In the embodiment of FIG. 6, the first scheduling information and the second scheduling information can further include identification information that can identify whether the data packet transmitted from the eNode B to the user equipment in accordance with the first scheduling information and the second scheduling information is an initial transmission packet or a retransmission packet. The identification information can be included in the first scheduling information and the second scheduling information in such a manner that a specific field of the first scheduling information and the second scheduling information is set to a value which has been previously set. For example, a first retransmission packet, a second retransmission packet, and a third retransmission packet can be identified in such a manner that specific values such as 1, 2 and 3 are set in a redundancy version (RV) field included in the first scheduling information and the second scheduling information. In addition to the RV field, other fields included in the first scheduling information and the second scheduling information, for example, at least one of an HARQ process ID field, a format field, an MCS field, an NDI (New data indicator), a TPC field, a "Cyclic shift for DMRS" field, a "TX antenna" field, and a CQI request field is set to a specific value, so that the value can be used as the identification information.

In the embodiment of FIG. 6, if the specific field included in the scheduling information, for example, the HARQ process ID field is set to a specific value, which is previously defined, the user equipment, which has received the corresponding scheduling information, regards that the corresponding scheduling information is configuration information for the persistent scheduling. Accordingly, the user equipment which has received the scheduling information including the HARQ process ID field set to the specific value transmits or receives data in accordance with the persistent scheduling using the corresponding scheduling information until radio bearer establishment or call establishment is released or other scheduling information is updated.

In this case, the user equipment, which has received the scheduling information including the HARQ process ID field set to a value other than the specific value, uses the scheduling information for a corresponding transport time interval (TTI) or uses the scheduling information until an HARQ processor related to the scheduling information reaches the maximum number of transmission times.

Figure 7:
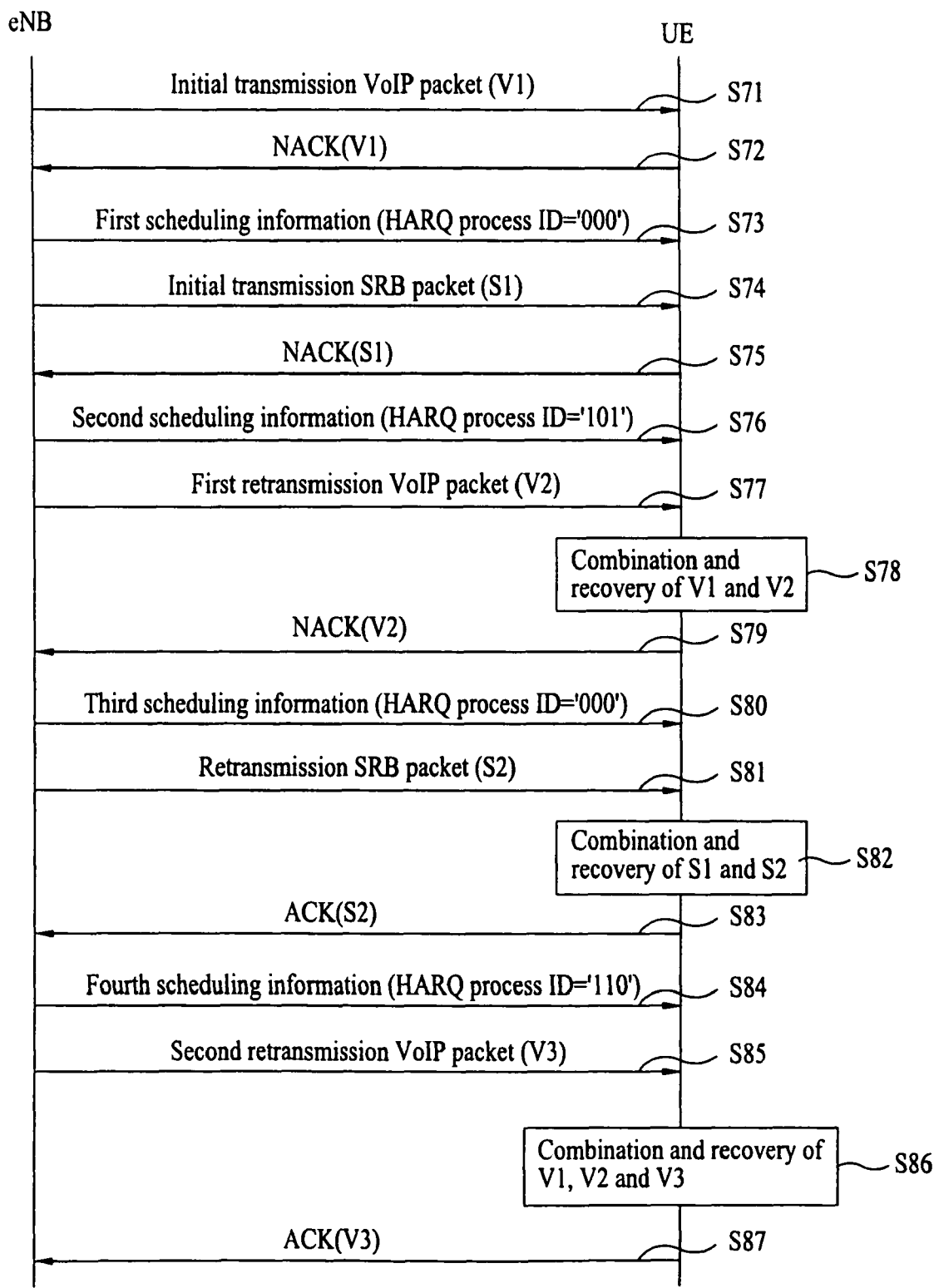
FIG. 7 is a flow chart illustrating a procedure of a method of data communication in accordance with another embodiment of the present invention.

FIG. 7 is a flow chart illustrating a procedure of a method of transmitting data in accordance with another embodiment of the present invention. According to the embodiment of FIG. 7, in the same manner as the embodiment of FIG. 6, the user equipment (UE) receives SRB packets in accordance with the dynamic scheduling while receiving voice data (VoIP packets) in accordance with the persistent scheduling. The embodiment of FIG. 7 is to identify the HARQ scheme according to the dynamic scheduling from the HARQ scheme according to the persistent scheduling. Hereinafter, description will be made only if necessary for understanding of the embodiment of the present invention, and description of a general procedure required for communication between the network and the user equipment will be omitted.

As described above, when the user equipment receives an initial transmission VoIP packet V1 or transmits the NACK signal (or ACK signal) for the initial transmission VoIP packet, the persistent scheduling is used. However, the dynamic scheduling is used for transmission of retransmission VoIP packets by the eNode B. Accordingly, after transmitting the NACK signal for the initial transmission VoIP packet, the user equipment should first receive scheduling information through the PDCCH to receive a retransmission VoIP packet from the eNode B.

If the user equipment receives the packet according to the dynamic scheduling, for example, an SRB packet while performing voice communication, the user equipment needs to receive the scheduling information by identifying the scheduling information transmitted for transmission and reception of the retransmission VoIP packet from the scheduling information transmitted for reception of the SRB packet. To this end, in the embodiment of FIG. 7, an HARQ process ID field included in the scheduling information transmitted for transmission and reception of the retransmission VoIP packet is set to at least one specific value. In the embodiment of FIG. 7, if the HARQ process ID field is set to '101', '110' and '111', the corresponding scheduling information corresponds to scheduling information transmitted for transmission and reception of the retransmission VoIP packet. The eNode B and the user equipment can schedule that the HARQ process ID field can previously be set to the specific values during an initial access procedure, a call establishment procedure, or an RB establishment procedure, so as to represent the scheduling information transmitted for transmission and reception of the retransmission VoIP packet.

Referring to FIG. 7, the eNode B (eNB) transmits the initial transmission VoIP packet V1 to the user equipment (UE) [S71]. The initial transmission VoIP packet means a voice data packet which is not a retransmission packet. If the user equipment fails to successfully receive the initial transmission VoIP packet, the user equipment transmits NACK to the eNode B [S72].

The eNode B transmits first scheduling information to the user equipment through the PDCCH to transmit an initial transmission SRB packet S1 [S73]. If the value set in the HARQ process ID field included in the first scheduling information is not a specific value, which is previously defined, the user equipment recognizes that the first scheduling information is not for the retransmission packet associated with the initial transmission VoIP packet V1. Since the HARQ process ID field of the first scheduling information is set to '000' not the value which is previously scheduled, the user equipment receives the initial transmission SRB packet S1, which is transmitted from the eNode B, using the first scheduling information [S74]. If the initial transmission SRB packet S1 is not successfully decoded, the user equipment transmits NACK to the eNode B [S75].

The eNode B transmits the second scheduling information to the user equipment through the PDCCH so as to transmit a first retransmission VoIP packet V2 associated with the initial transmission VoIP packet V1 to the user equipment, wherein the second scheduling information includes the HARQ process ID field set to '101' which is one of previously defined specific values [S76]. The user equipment can identify that the second scheduling information is scheduling information for a retransmission packet associated with the initial transmission VoIP packet V1 after identifying that the HARQ process ID field of the second scheduling information has been set to the previously defined value.

The eNode B transmits the first retransmission VoIP packet V2 to the user equipment in accordance with the second scheduling information, and the user equipment receives the first retransmission VoIP packet V2 using the second scheduling information [S77]. The user equipment combines the first retransmission VoIP packet V2 with the initial transmission VoIP packet V1 in accordance with the HARQ scheme and decodes the packet [S78]. If the user equipment fails to successfully decode the VoIP packet, the user equipment transmits NACK to the eNode B [S79].

The eNode B transmits third scheduling information to the user equipment through the PDCCH so as to transmit the retransmission packet associated with the initial transmission SRB packet S1 to the user equipment, wherein the third scheduling information includes an HARQ process ID field set to '000' [S80]. The eNode B transmits the retransmission SRB packet S2 to the user equipment in accordance with the third scheduling information, and the user equipment receives the first retransmission SRB packet S2 using the third scheduling information [S81]. The user equipment combines the received retransmission SRB packet S2 with the initial transmission SRB packet S1 and decodes an SRB packet [S82]. If the user equipment successfully decodes the packet, the user equipment transmits ACK to the eNode B [S83].

The eNode B transmits fourth scheduling information to the user equipment through the PDCCH so as to transmit a retransmission packet associated with the first retransmission VoIP packet V2, wherein the fourth scheduling information includes the HARQ process ID field set to '110' [S84]. The user equipment can recognize that the fourth scheduling information is scheduling information for a retransmission packet associated with the first retransmission VoIP packet V2 after identifying that the HARQ process ID field of the fourth scheduling information has been set to the previously defined value.

The eNode B transmits a second retransmission VoIP packet V3, which is a retransmission packet of the first retransmission VoIP packet V2, to the user equipment in accordance with the fourth scheduling information, and the user equipment receives the second retransmission VoIP packet V3 using the fourth scheduling information [S85]. The user equipment combines the second retransmission VoIP packet V3, the first retransmission VoIP packet V2, and the initial transmission VoIP packet V1 with one another in accordance with the HARQ scheme and decodes the VoIP packet [S86]. If the user equipment successfully decodes the VoIP packet, the user equipment transmits ACK to the eNode B [S87].

In the same manner as the embodiment of FIG. 7, if the HARQ process ID field is set to a plurality of specific values to represent the scheduling information transmitted for transmission and reception of a retransmission VoIP packet, the plurality of specific values can be included in the HARQ process ID field in consecutive order or a randomly selected specific value can be included in the HARQ process ID field. Instead of the HARQ process ID field, other field of the scheduling information can be set to the specific value to indicate that the scheduling information has been transmitted for transmission and reception of the retransmission VoIP packet.

In the embodiment of FIG. 7, the HARQ process ID field included in the scheduling information is set to the specific value so as to indicate that the corresponding scheduling information is scheduling information for the retransmission packet associated with the initial transmission VoIP packet transmitted in accordance with the persistent scheduling.

According to another embodiment, if a specific field included in the scheduling information, for example, the HARQ process ID field is set to the previously defined value, the user equipment, which has received the corresponding scheduling information, regards the corresponding scheduling information as configuration information for the persistent scheduling. Accordingly, the user equipment which has received the scheduling information including the HARQ process ID field set to the pre-defined value transmits or receives data in accordance with the persistent scheduling using the corresponding scheduling information until radio bearer establishment or call establishment is released or other scheduling information is updated.

In this case, the user equipment, which has received the scheduling information including the HARQ process ID field set to a value other than the pre-defined values, uses the scheduling information for a corresponding transport time interval (TTI) or uses the scheduling information until a HARQ processor related to the scheduling information reaches the maximum number of transmission times.

Figure 8:
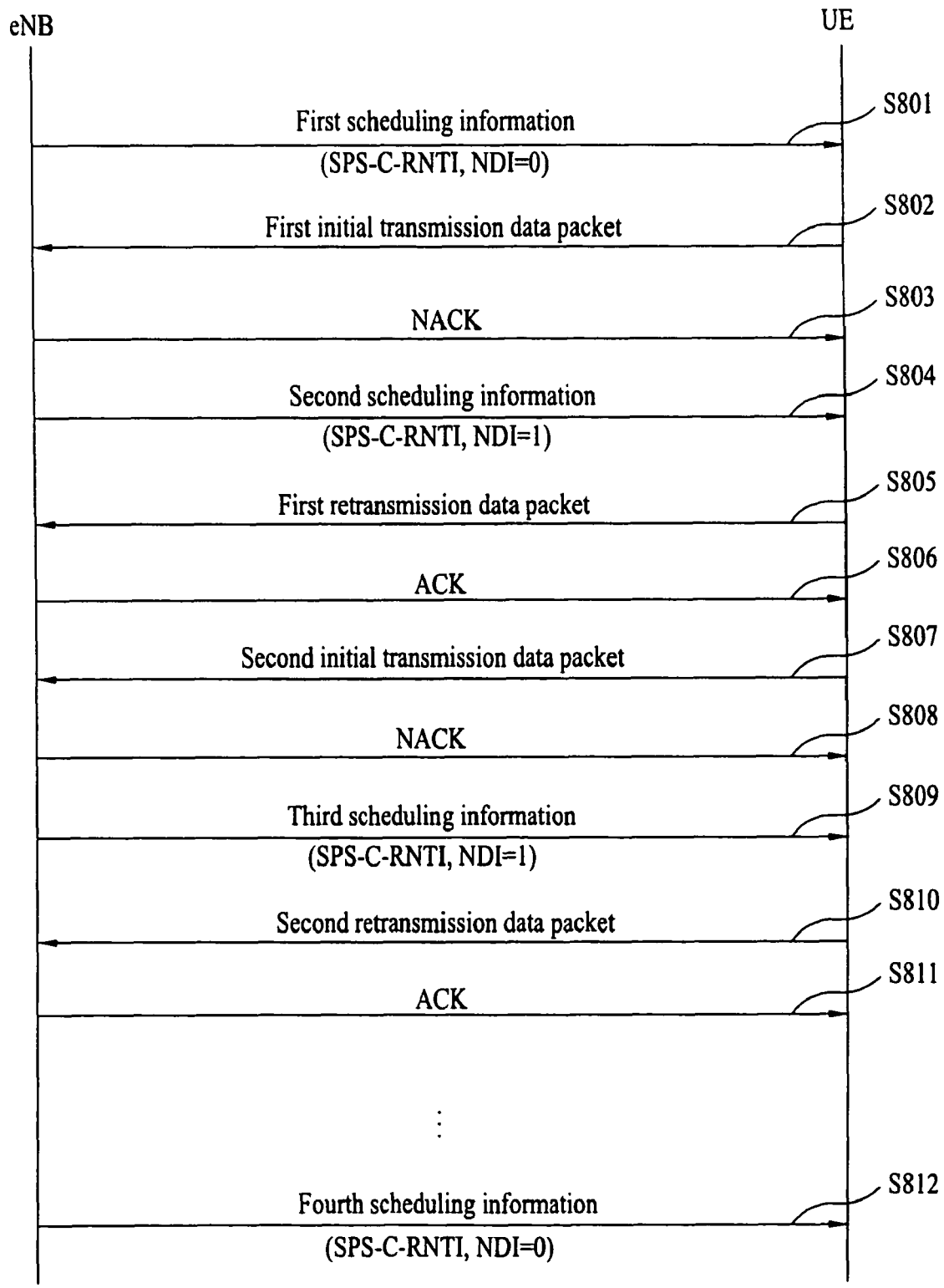
FIG. 8 is a flow chart illustrating a procedure of a method of data communication in accordance with another embodiment of the present invention.

FIG. 8 is a flow chart illustrating a procedure of data communication in accordance with another embodiment of the present invention. The embodiment in accordance with FIG. 8 is directed to a method of transmitting uplink data, e.g. voice data, from a user equipment (UE) to a eNode B (eNB). Hereinafter, description will be made only if necessary for understanding of the embodiment of the present invention, and description of a general procedure required for communication between the eNB and the UE will be omitted.

As described above, even in case that an initial transmission data packet is transmitted in the persistent scheduling mode, the dynamic scheduling mode is used for a retransmission packet for the initial transmission data packet. In addition, one SPS-C-RNTI is used for both first scheduling information for configuration of the persistent scheduling and second scheduling information for transmitting a retransmission packet associated with an initial transmission packet which has been transmitted in the persistent scheduling mode. In this regard, a field or an indicator included in scheduling information can be used to differentiate the first scheduling information from the second scheduling information. In the embodiment of FIG. 8, a new data indicator (NDI) is used. However, another field or indicator other than the NDI can be used. For example, to a redundancy version (RV) field can be set to a predefined value in order to indicate scheduling information for configuration of the persistent scheduling.

In this specification, the "initial transmission data packet" means a packet which is initially transmitted by an HARQ process in HARQ transmission. On the other hand, the "retransmission data packet" means a data packet which is retransmitted by a transmitting side after receiving NACK from a receiving side in response to the initial transmission data packet or another retransmission data packet.

Referring to FIG. 8, the eNB transmits first scheduling information for configuration of the persistent scheduling to the UE on a physical data control channel (PDCCH) [S801]. The first scheduling information includes uplink resource assignment information and HARQ-related information. The first scheduling information includes an SPS-C-RNTI which has been previously allocated to the UE and an NDI having the value of "0." The SPS-C-RNTI can be included in the first scheduling information in a CRC masking type. The UE can realize based on the SPS-C-RNTI that the first scheduling information is related to the persistent scheduling and based on the NDI having the value of "0" that the first scheduling information is for configuration of the persistent scheduling. The UE transmits uplink data packets periodically based on the uplink resource assignment information and the HARQ-related information included in the first scheduling information. The first scheduling information is used until a related radio bearer (RB) is released or the first scheduling information is reconfigured with other scheduling information.

After receiving the first scheduling information, the UE transmits a first initial transmission data packet to the eNB using the uplink resource assignment information [S802]. When failing to successfully decode the first initial transmission data packet, the eNB transmits NACK to the UE [S803]. Thereafter, the eNB transmits second scheduling information to the UE on the PDCCH [S804]. The second scheduling information includes uplink resource assignment information and HARQ-related information for transmission of a retransmission data packet. In addition, the second scheduling information includes the SPS-C-RNTI and an NDI having the value of "1" to indicate that the second scheduling information is to be used for transmission of a retransmission data packet.

The UE transmits a first retransmission data packet as a retransmission data packet for the first initial transmission data packet to the eNB using the uplink resource assignment information included in the second scheduling information [S805]. The eNB tries to decode the first retransmission data packet by combining it with the first initial transmission data packet based on an HARQ scheme and transmits ACK to the UE when succeeding in decoding the packet [S806].

The UE transmits a second initial transmission data packet to the eNB based on the uplink resource assignment information included in the first scheduling information [S807]. When failing to decode the second initial transmission data packet, the eNB transmits NACK to the UE [S808]. Thereafter, the eNB transmits third scheduling information including the SPS-C-RNTI to the UE [S809]. The third scheduling information includes an NDI having the value of "1" and the UE can realize based on the NDI that the third scheduling information is to be used for transmission of a retransmission data packet. The UE transmits a second retransmission data packet using uplink resource assignment information included in the third scheduling information to the eNB as a retransmission packet for the second initial transmission data packet [S810]. The eNB tries to decode the second retransmission data packet by combining it with the second initial transmission data packet based on the HARQ scheme and transmits ACK to the UE when succeeding in decoding the packet [S811].

When it is necessary for the eNB to change the configuration of the persistent scheduling, the eNB transmits fourth scheduling information to the UE [S812]. The fourth scheduling information includes the SPS-C-RNTI and an NDI having the value of "0." The UE can realize based on the NDI having the value of "0" that the fourth scheduling information is to be used for configuration information of the persistent scheduling. After receiving the fourth scheduling information, the UE utilizes uplink resource assignment information and HARQ-related information included in the fourth scheduling information to transmit initial transmission data packets to the eNB.

Figure 9:
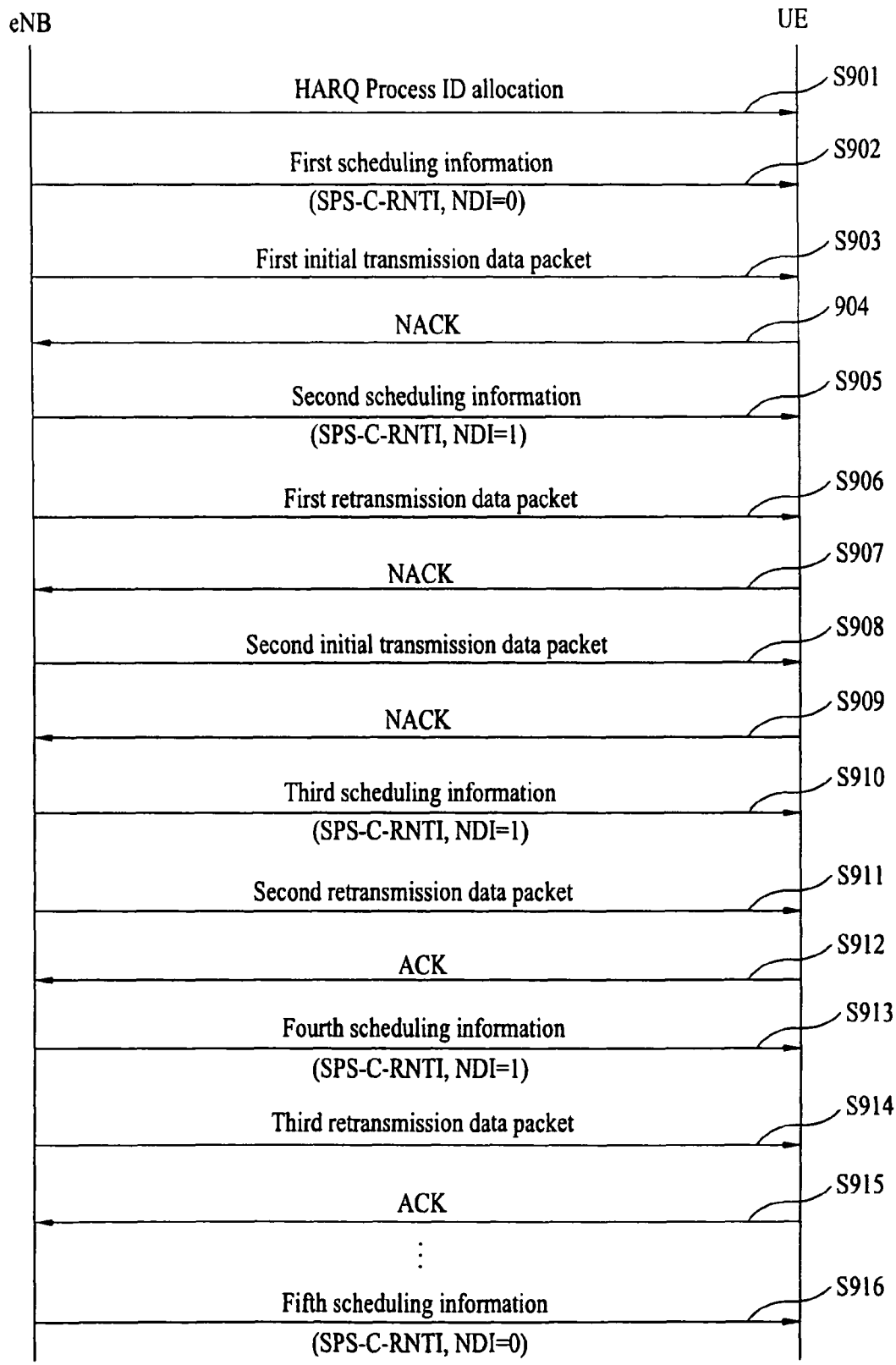
FIG. 9 is a flow chart illustrating a procedure of a method of data communication in accordance with another embodiment of the present invention.

FIG. 9 is a flow chart illustrating a procedure of data communication in accordance with another embodiment of the present invention. The embodiment in accordance with FIG. 9 is directed to a method of receiving downlink data, e.g. voice data, at a user equipment (UE) from a eNode B (eNB). Hereinafter, description will be made only if necessary for understanding of the embodiment of the present invention, and description of a general procedure required for communication between the eNB and the UE will be omitted.

Except that the embodiment according to FIG. 9 is related to receiving downlink data while the embodiment according to FIG. 8 is related to transmitting uplink data, the basic structure of the embodiment according to FIG. 9 is similar to that of the embodiment according to FIG. 8. Yet, in the embodiment according to FIG. 9, at least one HARQ process identifier (ID) among a plurality of HARQ process identifiers (IDs) available are previously allocated to the UE to be used for receiving downlink data in the persistent scheduling mode.

Referring to FIG. 9, the eNB allocates HARQ process IDs having the values of "0" and "1" among a plurality of HARQ process IDs available, e.g., among HARQ process IDs having the values of "0" to "7" to the UE for receiving downlink data packets according to the persistent scheduling [S901]. The HARQ process IDs can be allocated to the UE by being included in a radio resource control (RRC) message during a call setup or radio bearer (RB) setup procedure. Each of HARQ process identifiers for received initial downlink data packets is set to each of the allocated two HARQ process identifiers one after another by the UE. Although two HARQ process IDs are allocated for the persistent scheduling, one HARQ process ID or three or more HARQ process IDs can be pre-allocated to a UE for the persistent scheduling.

The eNB transmits first scheduling information for configuration of the persistent scheduling to the UE on a physical data control channel (PDCCH) [S902]. The first scheduling information includes downlink resource assignment information and HARQ-related information. The first scheduling information includes an SPS-C-RNTI which has been previously allocated to the UE and an NDI having the value of "0." The SPS-C-RNTI can be included in the first scheduling information in a CRC masking type. The UE can realize based on the SPS-C-RNTI that the first scheduling information is related to the persistent scheduling and based on the NDI having the value of "0" that the first scheduling information is to be used for configuration of the persistent scheduling. The UE receives downlink data packets periodically based on the downlink resource assignment information and the HARQ-related information included in the first scheduling information. The first scheduling information may be used until a related radio bearer (RB) is released or the first scheduling information is reconfigured with other scheduling information.

After receiving the first scheduling information, the UE receives a first initial transmission data packet from the eNB using the downlink resource assignment information [S903]. The UE sets an HARQ process ID of the first initial transmission data packet to be the first HARQ process ID having the value of "0" which has been previously allocated at the step of S901 to decode the first initial transmission data packet.

When failing to successfully decode the first initial transmission data packet, the UE transmits NACK to the eNB [S904]. The eNB transmits second scheduling information to the UE on the PDCCH [S905]. The second scheduling information includes downlink resource assignment information and HARQ-related information for receiving a retransmission data packet. An HARQ process ID included in the HARQ-related information has the value of "0." The UE can realize based on the HARQ process ID having the value of "0" that the second scheduling information is to be used for receiving a data packet which is a retransmission data packet associated with the first initial transmission data packet. In addition, the second scheduling information includes the SPS-C-RNTI and an NDI having the value of "1" to indicate that the second scheduling information is to be used for receiving a retransmission data packet.

The UE receives a first retransmission data packet as a retransmission data packet for the first initial transmission data packet from the eNB using the downlink resource assignment information and the HARQ-related information included in the second scheduling information [S906]. The UE tries to decode the first retransmission data packet by combining it with the first initial transmission data packet based on an HARQ scheme and transmits NACK to the eNB when failing to decode the packet [S907].

The UE receives a second initial transmission data packet from the eNB using the downlink resource assignment information and HARQ-related information included in the first scheduling information [S908]. The UE sets an HARQ process ID of the second initial transmission data packet to be the second HARQ process ID having the value of "1" which has been previously allocated at the step of S901 to decode the second initial transmission data packet.

When failing to decode the second initial transmission data packet, the UE transmits NACK to the eNB [S909]. The eNB transmits third scheduling information including the SPS-C-RNTI to the UE [S910]. The third scheduling information includes an NDI having the value of "1" and the UE can realize based on the NDI that the third scheduling information is to be used for receiving a retransmission data packet. Further the third scheduling information includes an HARQ process ID having the value of "1" The UE can realize based on the HARQ process ID having the value of "1" that the third scheduling information is to be used for receiving a data packet which is a retransmission data packet associated with the second initial transmission data packet.

The UE receives a second retransmission data packet using downlink resource assignment information and HARQ-related information included in the third scheduling information from the eNB as a retransmission packet for the second initial transmission data packet [S911]. The UE tries to decode the second retransmission data packet by combining it with the second initial transmission data packet based on the HARQ scheme and transmits ACK to the eNB when succeeding in decoding the packet [S912].

The eNB transmits fourth scheduling information including the SPS-C-RNTI to the UE on the PDCCH [S913]. The fourth scheduling information includes an NDI having the value of "1" to indicate that the fourth scheduling information is to be used for receiving a retransmission data packet. In addition, the fourth scheduling information includes an HARQ process ID having the value of "0" and the UE can realize based on the HARQ process ID having the value of "0" that the fourth scheduling information is to be used for receiving a data packet which is a retransmission data packet associated with the first initial transmission data packet.

The UE receives a second retransmission data packet as a retransmission data packet for the first initial transmission data packet from the eNB using the downlink resource assignment information and the HARQ-related information included in the fourth scheduling information [S914]. The UE tries to decode the second retransmission data packet by combining it with the first initial transmission data packet and the first retransmission data packet based on an HARQ scheme and transmits ACK to the eNB when succeeding in decoding the packet [S915].

When it is necessary for the eNB to change the configuration of the persistent scheduling, the eNB transmits fifth scheduling information to the UE [S916]. The fifth scheduling information includes the SPS-C-RNTI and an NDI having the value of "0." The UE can realize based on the NDI having the value of "0" that the fifth scheduling information is to be used for configuration of the persistent scheduling. After receiving the fifth scheduling information, the UE utilizes downlink resource assignment information and HARQ-related information included in the fifth scheduling information to receive initial transmission data packets from the eNB.

Figure 10:
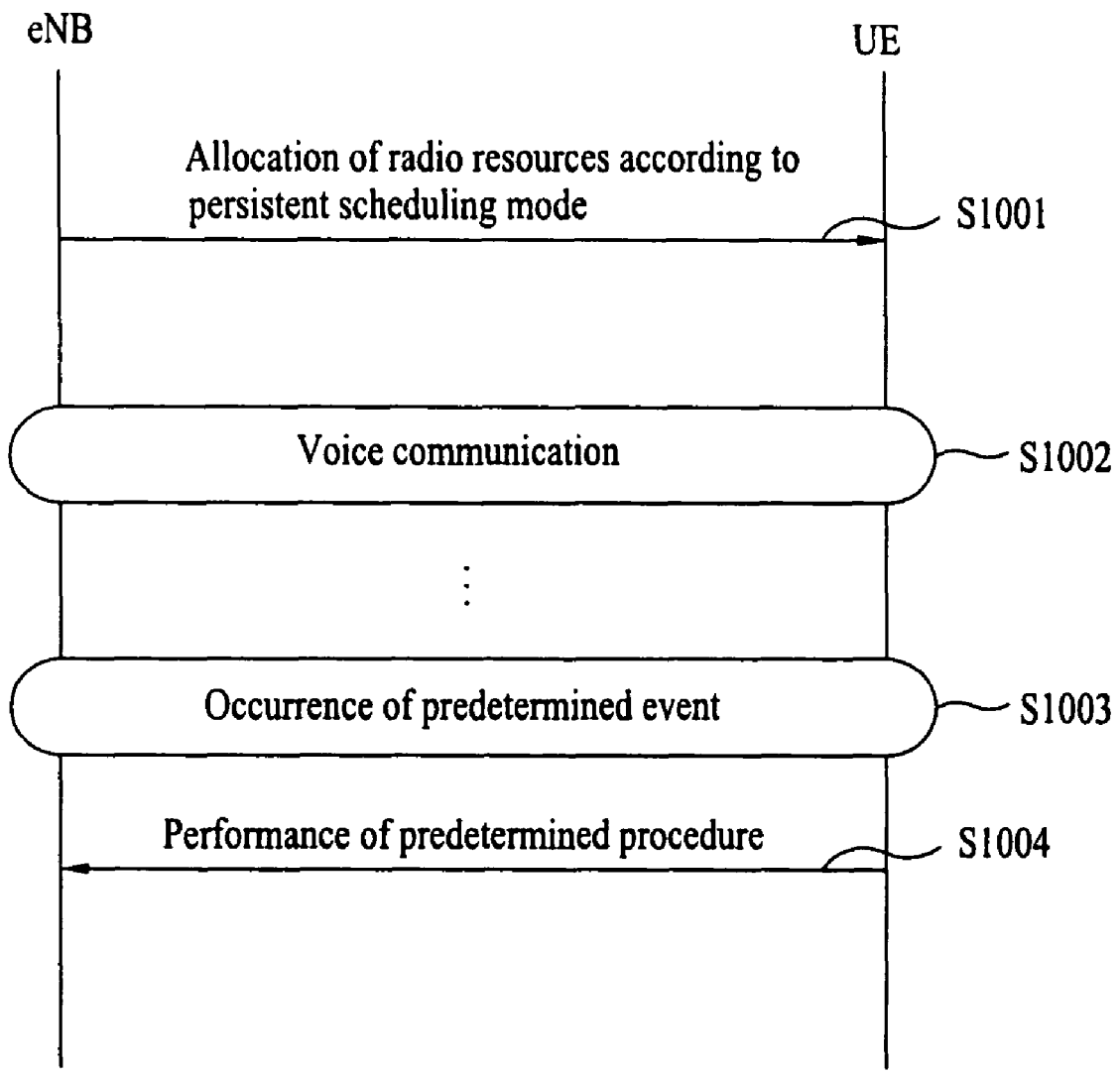
FIG. 10 is a flow chart illustrating a procedure of a method of data communication in accordance with another embodiment of the present invention.

FIG. 10 is a flow chart illustrating a procedure of a method of transmitting data in accordance with other embodiment of the present invention. If a predetermined event which is previously set occurs while the eNode B and the user equipment are transmitting and receiving data for communication, for example, voice communication in accordance with the persistent scheduling mode, the embodiment of FIG. 10 is intended to quickly take follow-up measures with respect to the corresponding event. Hereinafter, description will be made only if necessary for understanding of the embodiment of the present invention, and description of a general procedure required for communication between the network and the user equipment will be omitted.

Referring to FIG. 10, the eNode B previously allocates radio resources to the user equipment in accordance with the persistent scheduling mode [S1001]. Allocation of the radio resources can be performed in such a manner that the eNode B transmits scheduling information for voice communication to the user equipment during RB establishment procedure or voice call establishment procedure. The user equipment performs voice communication with the eNode B using the previously received scheduling information [S1002].

If a predetermined event occurs in the user equipment and/or the eNode B while the user equipment is performing voice communication in accordance with the persistent scheduling mode [S1003], the user equipment performs a predetermined procedure [S1004]. The predetermined event relates to a status that the user equipment cannot perform desirable communication using the previously allocated radio resources in accordance with the persistent scheduling mode. The predetermined procedure performed by the user equipment is associated with taking measures such as reallocation of radio resources in such a manner that the user equipment notifies the eNode B that the event has occurred.

Examples of the predetermined event include change of a codec mode used in voice communication, the generation of data having no relation with voice communication during voice communication, for example, SRB packets, RTCP data or TCP data, a case where a full header packet is generated while compressed header packets are generated, a case where the quantity of data that can be transmitted using the previously allocated radio resources in accordance with the persistent scheduling mode is more than the quantity of the generated data, and a case where conversion between a talk spurt and a silent period occurs.

Examples of the predetermined procedure performed by the user equipment in the step S81 are as follows.

First, the user equipment requests the eNode B to allocate additional radio resources or new radio resources by transmitting predetermined information through a previously established channel, for example, a D-SR channel.

Second, if there is no previously established channel, the user equipment requests the eNode B to allocate additional radio resources or new radio resources by performing a random access procedure through a random access channel (RACH) and transmitting predetermined information to the eNode B.

Third, the user equipment transmits a buffer status report to the eNode B. Namely, the user equipment requests the eNode B to allocate additional radio resources or new radio resources by transmitting information related to the quantity of data stored in its buffer.

The aforementioned embodiments are achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment. Moreover, it will be apparent that some claims referring to specific claims may be combined with another claims referring to the other claims other than the specific claims to constitute the embodiment or add new claims by means of amendment after the application is filed.

The embodiments of the present invention have been described based on data transmission and reception between the eNode B and the user equipment. A specific operation which has been described as being performed by the eNode B may be performed by an upper node of the eNode B as the case may be. In other words, it will be apparent that various operations performed for communication with the user equipment in the network which includes a plurality of network nodes along with the eNode B may be performed by the eNode B or network nodes other than the eNode B. The eNode B may be replaced with terms such as a base station, a fixed station, Node B, and access point. Also, the user equipment may be replaced with terms such as mobile station (MS) and mobile subscriber station (MSS).

The embodiments according to the present invention may be implemented by various means, for example, hardware, firmware, software, or their combination. If the embodiment according to the present invention is implemented by hardware, the embodiment of the present invention may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

If the embodiment according to the present invention is implemented by firmware or software, the method of transmitting and receiving data in the wireless communication system according to the embodiment of the present invention may be implemented by a type of a module, a procedure, or a function, which performs functions or operations described as above. A software code may be stored in a memory unit and then may be driven by a processor. The memory unit may be located inside or outside the processor to transmit and receive data to and from the processor through various means which are well known.

It will be apparent to those skilled in the art that the present invention can be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

INDUSTRIAL APPLICABILITY

The present invention can be used in a wireless communication system such as a mobile communication system or a wireless Internet system.

The invention claimed is:

1. A method of data communication for user equipment (UE) in a wireless communication system, the method comprising:
   receiving, at a user equipment, first scheduling information from a network, the scheduling information comprising a new data indicator (NDI) and assignment information;
   determining that the assignment information is initial assignment information in accordance with semi-persistent scheduling if the NDI associated with the first scheduling information value is a first value;
   receiving an initial transmission data packet in accordance with the first scheduling information wherein an HARQ process identifier associated with the initial transmission data packet has been previously allocated by the network prior to receiving the scheduling information; and
   receiving second scheduling information from the network, the second scheduling information comprising an NDI and assignment information;
   determining that the next data packet to be received is a retransmission data packet if the NDI associated with the second scheduling information has a second value; and
   receiving the retransmission data packet wherein the second scheduling information further comprises an HARQ process identifier associated with retransmission data packet.

2. The method of claim 1, wherein the second scheduling information includes downlink resource assignment information and HARQ-related information.

3. The method of claim 1, wherein the HARQ process identifier associated with the received initial transmission data packet is set to a first one of two or more corresponding HARQ process identifier values, in sequence, if there are two or more HARQ process identifiers.

4. The method of claim 1, wherein the first and second scheduling information is received for a first UE.

5. The method of claim 4, wherein the first and second scheduling information includes a Semi-Persistent Scheduling C-RNTI and wherein the first UE identity is defined by the Semi-Persistent Scheduling C-RNTI.

6. The method of claim 4, wherein, if the first and second scheduling information is received for a second UE identity, utilizing the scheduling information as resource assignment information according to dynamic scheduling to receive a downlink data packet from the network.

7. The method of claim 6, wherein the first and second scheduling information includes a Semi-Persistent Scheduling C-RNTI, and wherein the second UE identity is defined by the C-RNTI.

8. User equipment (UE) for use in a wireless communication system, the user equipment comprising:

means for receiving first scheduling information from a network, the scheduling information comprising a new data indicator (NDI) and assignment information;

means for determining that the assignment information is initial assignment information in accordance with semi-persistent scheduling if the NDI associated with the first scheduling information value is a first value, means for receiving an initial transmission data packet in accordance with the first scheduling information, wherein an HARQ process identifier associated with the initial transmission data packet has been previously allocated by the network prior to receiving the scheduling information;

means for receiving second scheduling information from the network, the second scheduling information comprising an NDI and assignment information;

means for determining that a next data packet to be received is a retransmission data packet if the NDI associated with the second scheduling information has a second value; and means for receiving retransmission data packet wherein the second scheduling information further comprises an HARQ process identifier associated with retransmission data packet.

9. The user equipment of claim 8, wherein the second scheduling information includes downlink resource assignment information and HARQ-related information.

10. The user equipment of claim 8, wherein the HARQ process identifier associated with the received initial transmission data packet is set to a first one of two or more corresponding HARQ process identifier values, in sequence, if there are two or more HARQ process identifiers.

11. The method of claim 8, wherein the first and second scheduling information is received for a first UE.

12. The method of claim 11, wherein the first and second scheduling information includes a Semi-Persistent Scheduling C-RNTI and wherein the first UE identity is defined by the Semi-Persistent Scheduling C-RNTI.

13. The method of claim 11, wherein, if the first and second scheduling information is received for a second UE identity, utilizing the scheduling information as resource assignment information according to dynamic scheduling to receive a downlink data packet from the network.

14. The method of claim 13, wherein the first and second scheduling information includes a Semi-Persistent Scheduling C-RNTI, and wherein the second UE identity is defined by the C-RNTI.

* * * * *